United States Patent [19]
Grinberg et al.

[11] 4,073,571
[45] Feb. 14, 1978

[54] CIRCULARLY POLARIZED LIGHT SOURCE

[75] Inventors: Jan Grinberg, Los Angeles; Leroy J. Miller, Canoga Park, both of Calif.

[73] Assignee: Hughes Aircraft Company, Culver City, Calif.

[21] Appl. No.: 683,557

[22] Filed: May 5, 1976

[51] Int. Cl.$^2$ .............................................. G02F 1/13
[52] U.S. Cl. .................................. 350/337; 350/147
[58] Field of Search ............... 350/147, 154, 157, 158, 350/160 LC

[56] References Cited
U.S. PATENT DOCUMENTS 3,669,525  6/1972  Adams et al. ..................... 350/158

Primary Examiner—Edward S. Bauer
Attorney, Agent, or Firm—Donald C. Keaveney; W. H. MacAllister

[57] ABSTRACT

There is disclosed a circularly polarized light source including a circular light polarizer using cholesteric liquid crystal material in an arrangement such that substantially 100% of the unpolarized light input may be utilized in a circularly polarized output in either a narrow band or wide band configuration. The circular polarizer itself comprises one or a plurality of liquid crystal cells having liquid crystal material of a predetermined ratio by weight of cholesteric to nematic liquid crystal type in each cell. The ratio of the types of materials determines a central wavelength to which each cell is tuned in its polarizing action. If a single cell is used, light of a predetermined bandwidth around its central wavelength is polarized. If a plurality of cells are stacked in a sandwich arrangement wherein each cell is tuned to a different wavelength selected in such a sequentially stepped fashion that the bandwidths for the cells form a continuous spectrum, then there is formed a wideband polarizer which can readily encompass the entire visible wavelength region of the spectrum.

7 Claims, 3 Drawing Figures

CIRCULARLY POLARIZED LIGHT SOURCE

BACKGROUND OF THE INVENTION

Currently used arrangements for producing circularly polarized light are described, for example, at page 42 of a textbook entitled "Introduction to Modern Optics" by Grant R. Fowles, published by Holt, Rhinehart & Winston in 1968. As shown therein the arrangement comprises a linear polarizer having its transmission axis positioned at a 45° angle to the orthogonal fast and slow axes of a quarter waveplate through which the light passes after passing through the linear polarizing crystal.

Such a circular polarizer has two major drawbacks. First, the extinction ratio for such devices can have an acceptably high value only for a narrow bandwidth of light wavelengths. By the "extinction ratio" is here meant the ratio of the light intensity transmitted by two sequentially positioned polarizers that each pass polarization of the same circular polarization handedness sense to the light intensity transmitted by two such polarizers which respectively pass circular polarization handedness senses which are opposite. Outside of the narrow bandwidth for which known circular polarizers have a high extinction ratio, the ratio drops fast. This characteristic is intrinsic to the presently available devices because, as noted, they are constructed from a linear polarizer and a quarter waveplate. Naturally, the waveplate can be a quarter waveplate only for one wavelength. For other wavelengths the plate retardation in terms of the wavelength changes proportionally to the reciprocal of the wavelength. Thus, the light instead of being circularly polarized is elliptically polarized. Circular polarizers for the visible wavelength region have extinction ratios at the two extremes of the visible region of 5 or 6 at 400 nm and of 6 or 7 at 700 nm compared to 1000 at 550 nm.

The second major drawback of known absorption type circular polarizers is that they absorb between 60% and 80% of the incident unpolarized light. This is a problem not only because the efficiency of the resulting light source is thereby low, but also because the dissipated power in the polarizer, in the case of a high intensity beam, damages the polarizer.

In view of these problems, systems such as that disclosed, for example, in U.S. Pat. No. 2,958,258 to D. H. Kelly or U.S. Pat. No. 3,893,758 to Hunzinger et al, have used linearly polarized light rather than circularly polarized light in high intensity projection systems requiring polarized light sources. Such systems may, for example, use a wideband linear polarizer of the type shown in U.S. Pat. No. 3,403,731, issued to S. M. MacNeille, in order to obtain the wideband or white polarized light source needed for the system. Although the MacNeille device solves the problem of providing a wideband rather than a narrow band polarizer for linearly polarized light, it does not purport to be useful for providing circularly polarized light which may often be more desirable than linearly polarized light for various system requirements.

There have been proposals in the literature to use alternately left-handed and right-handed cascaded cholesteric liquid crystal cells to form narrow band or notch color filters. Such a proposal was made, for example, by James Adams et al in an article entitled "Cholesteric Films as Optical Filters" which appeared in Vol. 42, No. 10, of the September 1971 issue of the *Journal of Applied Physics* beginning at page 4096. See also an article by Sato et al entitled "Liquid Crystal Color Light Valve" appearing in the February 1974 issue of the *IEEE Transactions on Electron Devices at page* 171. These devices utilize the polarizing action of liquid crystal materials. However, they do not form wideband circular polarizers which will take a source of unpolarized white light and transform it into a beam of circularly polarized white light. Furthermore, even at narrow bandwidths these devices inherently use only 50% of the incident unpolarized light since their function by definition is to transmit 50% of the incident light as circularly polarized light in a first handedness sense (left-handed or right-handed as the case may be) and to reflect the other 50% of the incident unpolarized light as circularly polarized light of the opposite handedness sense.

It is an object of the present invention to overcome the foregoing shortcomings of the prior art and to provide a circularly polarized light source using one or more cholesteric liquid crystal cell means to achieve 100% nominal efficiency in the use of the incident light at any bandwidth rather the 50% shown in the prior art and/or to achieve a wideband circular polarizer capable of producing an output beam of white circularly polarized light.

SUMMARY OF THE INVENTION

This is achieved by providing a circular polarizer comprising one or more cholesteric liquid crystal cells with mirror means arranged to produce two transits of light through the polarizer, the first being that of the unpolarized light and the second being that of the light first reflected from the polarizer but with its circular polarization handedness sense reversed. Wideband characteristics are achieved by providing a group of stacked polarizer cells each tuned to a different central polarizing wavelength such that the totality of their bandwidths covers the entire while light spectrum.

BRIEF DESCRIPTION OF THE DRAWINGS

These and other features, objects and advantages will be more readily undetrstood from the following detailed description taken in conjunction with the attached drawing wherein like reference characters refer to like parts throughout and in which.

DETAILED DESCRIPTION OF THE DRAWINGS

Figure 1:
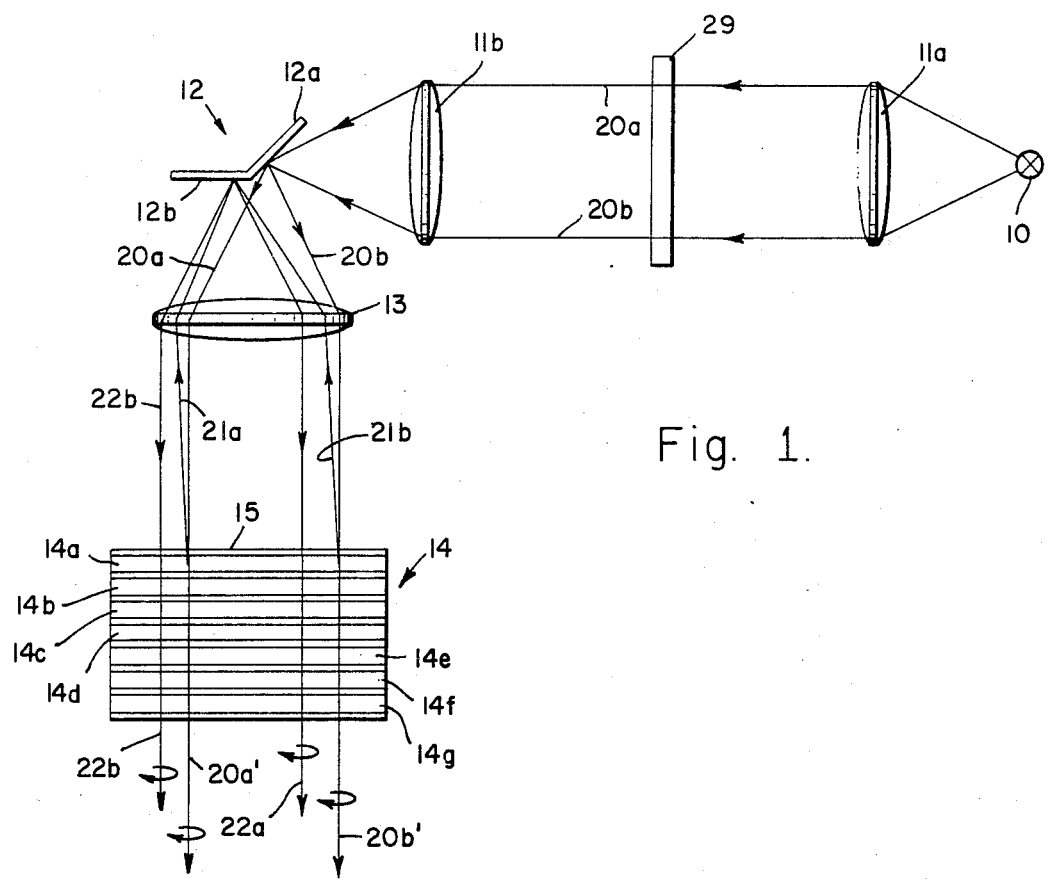
FIG. 1 is an optical schematic view showing a circularly polarized light source system in accordance with the present invention.
Figure 2:
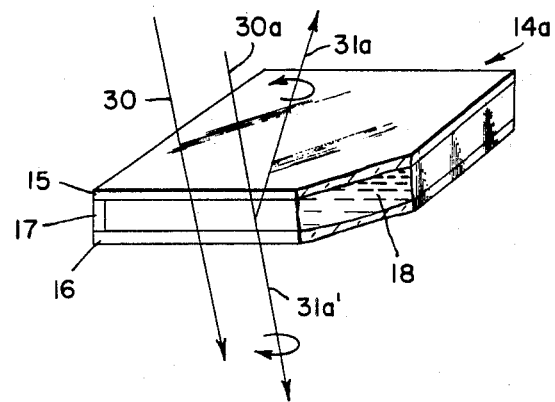
FIG. 2 is an enlarged prospective view partially broken away of one of the liquid crystal cell members of the wideband circular polarizer device shown as a part of the system of FIG. 1.

There is shown in FIG. 1 a circularly polarized light source which includes a wideband circular polarizer 14 using a multilayer cholesteric liquid crystal sandwich consisting of the liquid crystal cells 14a, 14b, 14c, 14d, 14e, 14f and 14g. It will, of course, be understood that seven cells are shown by way of example only and that as many cells are appropriate to a given application may be used. The details of the exemplary individual cell 14a are shown in FIG. 2. The exact detailed characteristics of seven cells such as 14a–14g which may be used to form an exemplary white light circular polarizer are given at the end of the specification.

Where a single cell such as shown in FIG. 2 is used it has, of course, an individual entrance window 15 and exit window 16 each of which consist of a flat transparent member of glass or other similar material. There members are held a predetermined distance apart in parallel opposed spaced relationship by spacer member 17 which extends around the four edges of the cell. An appropriate liquid crystal material 18 is included in the cell which may be fabricated in accordance with techniques well known in the art. Where a plurality of cells are to be used in stacked relationship they may be made up separately with the entrance window of one simply abutting the exit window of the cell ahead of it, or the stack 14 may be prepared as a unitary structure wherein a single interface member of glass, plastic or the like serves as both the entrance window for one cell and the exit window for the preceding cell. Such a stack arrangement is diagrammatically suggested in FIG. 1.

The cholesteric liquid crystal material 18 on which light rays 30 and 30a, for example, are incident reflects one circular polarization handedness sense of the incident unpolarized light in a bandwidth $\Delta\lambda$ centered around a central wavelength $\lambda_0$ for half of the incident energy and transmits the other half of the energy in the opposite circular polarization handedness sense. Reflection occurs throughout the bulk of the liquid crystal material and is independent of which side of the cell the light enters from. In FIG. 2 this is schematically shown for the incident ray 30a which is at or near the central wavelength $\lambda_0$. The reflected ray 31a may, for example, be left-hand circularly polarized if the liquid crystal material in the cell 14a makes it a left-handed cell. In this case the transmitted ray 31a will be right-hand circularly polarized. The ray 30 is illustrative of a ray whose wavelength falls outside the bandwidth $\Delta\lambda$ and is transmitted on through the cell as unpolarized light.

The cholesteric liquid crystal material 18 is a natural circular polarizer. It reflects half of the incident energy within a predetermined bandwidth in one handedness sense and it transmits the other half of the incident energy within this bandwidth in the opposite handedness sense. The light energy having a wavelength outside the bandwidth $\Delta\lambda$ is unaffected by the polarizer and transmits through it unpolarized. All of the energy in a right-hand circularly polarized incident ray incident on a left-hand cell is also transmitted through it unchanged. The central wavelength $\lambda_0$ of the polarizing bandwidth $\Delta\lambda$ is given by the expression $\lambda_0 = 2(np)\sin\alpha$ when $n$ equals the refractive index of the cholesteric material 18, $p$ is the pitch of the cholesteric liquid crystal material and $\alpha$ is the angle of incidence of the incoming wide bandwidth unpolarized light.

In the structure 14 shown in FIG. 1. several cell layers are used so that each layer can be tuned to a portion of the bandwidth of the incident white light. Due to the nature of the effect, each layer leaves unaffected light outside its own bandwidth. All wavelengths of this transmitted light proceed through the device until they encounter a cell tuned to circularly polarize the given wavelength of interest. Superimposing a plurality of layers in series each of which is tuned to a central wavelength $\lambda_0$ such that the bandwidths $\Delta\lambda$ of the succeeding cells together form a continuous spectrum covering the spectrum of the incident light (which is normally white light including all of the visible wavelengths in applications of primary interest) thus results in a wideband circular polarizer. That is to say, by selecting the central wavelength of each of the cells 14a–14g to have succeeding values differing from each other by amounts such that the half power bandwidth $\Delta\lambda a$ of cell 14a has a maximum wavelength value equal to or greater than the minimum wavelength value of the half power bandwidth $\Delta\lambda b$ of the cell 14b, etc. will result in the desired wideband circular polarizer.

Each of the cells is constructed to have the same handedness sense. That is to say, each of the cells 14a through 14g is either a left-handed circular polarizer or a right-handed circular polarizer, but each of the cells is tuned to a different central polarizing wavelength.

To tune the liquid crystal cells to the desired wavelength it is preferred to add predetermined amounts of nematic liquid crystal material to the cholesteric liquid crystal material and to vary the ratio by weight of the two constituent materials of the mixture to each other in order to vary the tuning. The number of layers required is determined by the required total bandwidth and the $\Delta\lambda$ of each liquid crystal layer. The latter parameter is mainly determined by the average birefringence coefficience $\Delta n$ of the mixture. More generally, $\Delta\lambda = \lambda_0 \Delta n/n$ where $\Delta n$ is the average birefringence coefficient of the mixture and $n$ is the birefringence of the cholesteric liquid crystal material alone. For example, a mixture in which $\Delta n$ equals 0.15 and $n$ equals 1.5 the bandwidth $\Delta\lambda$ is $\pm 10\%$ of the central wavelength $\lambda_0$. For the device 14 of FIG. 1 to cover the visible spectrum it has been found that about seven layers of liquid crystal approximately 2 mils thick each are required using a preferred mixture described below. Each 2 mil thick layer was confined in a cell about 2 inches square. The light absorption was negligible.

An optical system using this device to form a circularly polarized white light source that nominally converts 100% of the ordinary unpolarized or randomly polarized light to circularly polarized light is shown in FIG. 1. Light from the source 10, which may be an arc lamp or any other convenient light source, is collimated by lens 11a and, after passing through filter 29, is focused by lens 11b onto a first portion 12a of the surface of a mirror 12. Filter 29 sets the total bandwidth limits of the desired final output. For the white light example given below filter 29 has a pass band of 410–670 nanometers (nm). If a narrower bandwidth (or single color) output is desired, a narrower band filter and appropriately redesigned cells would be used. The mirror 12 has at least two portions the tangent line to the reflecting surfaces of which respectively intersect at an acute angle. As shown in FIG. 1 the two portions 12a and 12b are both planar mirrors, but it will be apparent to those skilled in the art that many other configurations (such as a drum mirror) are possible in a given application. The tangents to the surfaces 12a and 12b are such in the example of FIG. 1 that they intersect at a 45° angle as shown by the planar surfaces themselves. This again, however, is merely a preferred design choice for value of the angle. Light reflected from the first portion 12a of the mirror is focused by a collimating lens 13 onto the circular polarizer 14.

Let us consider paraxial rays 20a and 20b from the light source 10 which, for purposes of illustration, will be considered to be the rays representing the wavelength portion of the light from source 10 in these geometric paths which have wavelengths falling within the polarizing bandwidth Δλa of the first cell 14a. The ray 20a is reflected from the mirror surface 12a and refracted by lens 13a while still in its unpolarized state to be incident on the entrance window 15 of cell 14a. Since the cell 14a is in this illustration taken to be a left-hand polarizer, the portion 20a' of the incident beam 20a is transmitted through the device as a right-handed circularly polarized light beam. The reflected portion 21a is circularly polarized in a left-handed sense. This ray 21a again passes through lens 13 in the opposite direction and strikes the second portion 12b of the surface of mirror 12 since ray 20a is incident on entrance window 15 at a small angle of incidence to the normal to the surface of window 15. That is to say, entrance window 15 and mirror surface 12b are not quite parallel to each other. Reflection of ray 21b from surface 12b is now reflection of a circularly polarized light beam and such reflection will reverse the handedness sense of the circularly polarized light. Thus, the twice reflected ray 22a is now right-hand circularly polarized and as such is transmitted through the cell 14a. Since it either falls outside the polarizing bandwidth Δλ of the other remaining cells, or if within their Δλ is already right-hand polarized, it is unaffected by them except for negligible internal reflections. Thus, the two rays 22a and 20a together nominally constitute 100% of the energy in the original ray 20a and are both right-hand circularly polarized. Actual losses are negligible.

Similarly, ray 20b, which is the other paraxial ray analogous to ray 20a, is first reflected from the first portion 12a of the surface of mirror 12 as unpolarized light and is refracted by lens 13 to be focused on the circular polarizer 14. The first reflection of the ray 20b from cell 14a is indicated as ray 21b and is the left-handed circularly polarized half of the ray 20b. The right-handed circularly polarized portion 20b' is transmitted through the polarizer 14. The ray 21b is returned to the mirror surface 12b through lens 13 where its left-handed circular polarization sense is reversed to a right-handed sense in the reflected ray 22b. This reflected right-handed circularly polarized ray 22b is now transmitted through the polarizer 14 and together with the portion 20b' comprising the half of the incident light in ray 20b which was originally transmitted by polarizer 14 as right-handed polarized light comprises substantially all of the energy in the ray 20b. Stray reflections and slight absorption create minor losses.

A similar analysis applies to the wavelengths in the path of rays 20a and 20b falling within the polarizing bandwidth of each of the other cells 14b–14g. Also, similar analyses apply to all other rays between 20a and 20b from the light source which are focused by lens 11b onto the mirror 12. Thus, the output of polarizer 14 is uniformly circularly polarized light of a predetermined handedness sense and comprises nominally 100% of the useful light from the light source 10.

In certain applications, of course, it is possible that one may want a narrow bandwidth rather than a wide bandwidth polarizer. If this is the case either a single cell such as shown in FIG. 2 or a smaller number of cells than shown in FIG. 1 may be used in conjunction with external polarizing and/or analyzing devices in whatever manner is necessary in a particular system to provide light of a predetermined wavelength bandwidth all of which is circularly polarized.

In a particular preferred exemplary embodiment of the circular polarizer 14, the seven cells 14a–14g respectively had the following characteristics.

Figure 3:
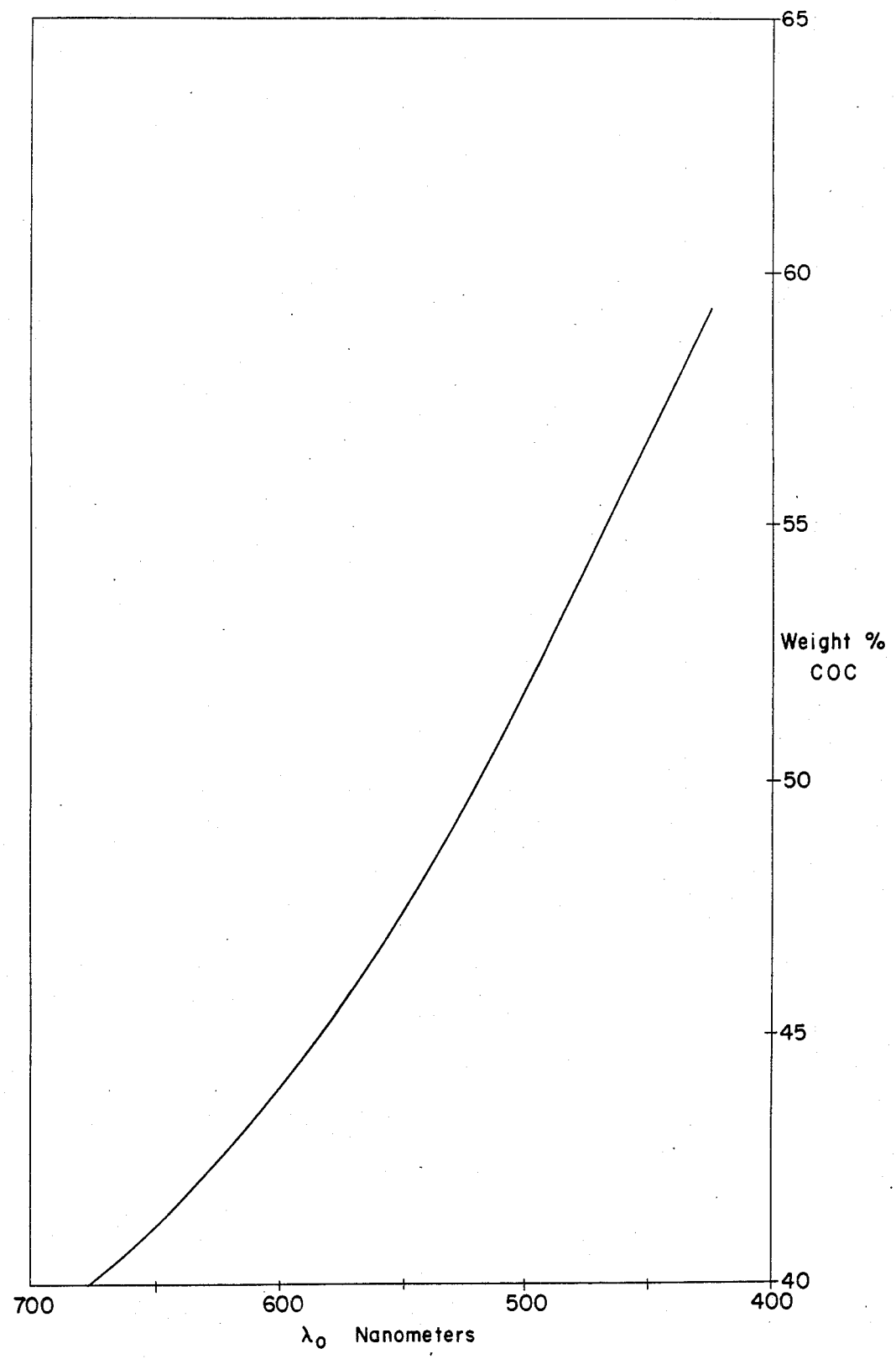
FIG. 3 is a graph showing central polarizing wavelength $\lambda_0$ as a function of composition ratio for one exemplary liquid crystal mixture which may be used in the cells shown in FIGS. 1 and 2.

Each cell was about 2 inches square and contained a layer of liquid crystal material about 2 mils thick. The composition of each layer was a mixture of C.O.C. (a cholesteric l.c) and 2N10 (a nematic l.c.). The percentage be weight of C.O.C. in the total mixture in each cell respectively is given in the second column of Table I below. The resulting $\lambda_0$ and $\Delta\lambda$ for each cell are given in the third and fourth columns. These values are plotted in the graph of FIG. 3.

The C.O.C. constituent of each mixture was cholesteryl oleyl carbonate.

The 2N10 constituent of each mixture was itself a submixture having the following fixed composition by weight:
 5 parts para-butoxyphenyl para'-butoxybenzoate
 9 parts para-butoxyphenyl para'-hexyloxybenzoate
 9 parts para-butoxyphenyl para'-octyloxybenzoate
 15 parts para-butylphenyl para'-toluate The final mixtures and resulting characteristics were as follows:

TABLE I

| Cell | % C.O.C. by Weight | $\lambda_0$ nm | $\Delta\lambda$ nm ½ Power |
|---|---|---|---|
| 14a | 40.2 | 650 | 670–625 |
| 14b | 43.1 | 610 | 630–585 |
| 14c | 46.1 | 566 | 585–538 |
| 14d | 50.3 | 515 | 538–495 |
| 14e | 53.8 | 481 | 495–465 |
| 14f | 56.4 | 453 | 465–440 |
| 14g | 58.6 | 431 | 440–410 |

It is, of course, possible to use many different liquid crystal mixtures. Different characteristics of the type set forth above will be obtained for each in accordance with the principles disclosed herein.

What is claimed is:

1. A circularly polarized light source comprising:
  a. at least one circularly polarizing cholesteric liquid crystal cell means, said means reflecting a first portion of unpolarized light incident thereon in one circular polarization handedness sense and transmitting a second portion of said light in the other circular polarization handedness sense within a predetermined wavelength bandwidth around a predetermined central wavelength, the polarization of the light outside said bandwidth being unaffected by the cell and said light being transmitted through said cell unpolarized;
  b. mirror means having an acute angle between at least two intersecting tangent lines which are respectively tangent to at least first and second portions of the surface of said mirror means for receiving and reflecting light and for producing a change from one circular polarization handedness sense to the other when circularly polarized light is reflected from said mirror means;
  c. a source of unpolarized light;
  d. means to focus light from said source onto a first of said portions of said mirror means, said mirror means being positioned relative to said light source and said liquid crystal cell means so that said focused light is reflected from swaid first portion of said mirror means to said cell means;
  e. collimating lens means positioned between said mirror means and said cell means to collimate said light reflected from said mirror means towards said cell means; the plane of the entrance window of said cell means being positioned at an acute angle with respect to the direction of propagation of said collimated reflected light such that the handedness sense portion of said collimated light which is reflected by said cell means returns through said collimating lens to a second of said portions of said mirror means and after reversal of the sense of circular polarization handedness at said mirror means is again reflected back through said collimating lens to said cell means for transmission therethrough to produce an output beam from said cell means in which all of the light from said light source within said predetermined wavelength band is circularly polarized in the same handedness sense.

2. A device as in claim 1 and further including:
  a. a plurality of said circularly polarizing liquid crystal cell means sequentially positioned in stacked relationship to each other to form a multilayer cholesteric liquid crystal sandwich means, each of said cells reflecting light of the same circular polarization handedness sense but being tuned to a different predetermined central wavelength and thus having a different wavelength pass bandwidth, the totality of said pass bandwidths combining to define a continuous wideband pass spectrum.

3. A device as in claim 2 wherein each of said liquid crystal cell means contains a mixture of both nematic and cholesteric liquid crystal material and wherein said predetermined central wavelength to which each said cell is tuned is determined by the ratio by weight of cholesteric liquid crystal material in each said cell to the total mixture in the respective cell.

4. A device as in claim 1 and further including:
  a. filter means having a pass bandwidth equal to the bandwidth of said wideband pass spectrum.

5. A device as in claim 1 wherein said liquid crystal cell means contains a mixture of both nematic and cholesteric liquid crystal material and wherein said predetermined central wavelength to which said cell is tuned is determined by the ratio by weight of cholesteric liquid crystal material to the total mixture in said cell.

6. A circular light polarizer comprising:
  a. a plurality of circularly polarizing cholesteric liquid crystal cell means sequentially positioned in stacked relationship to each other to form a multilayer cholesteric liquid crystal sandwich means, each of said cells reflecting a first portion of unpolarized light incident thereon in one circular polarization handedness sense and transmitting a second portion in the other circular polarization handedness sense within a predetermined wavelength bandwidth around a predetermined central wavelength; the polarization of the light outside and bandwidth being unaffected by the cell and being transmitted through it unpolarized; each of said cells reflecting light of the same circular polarization handedness sense but being tuned to a different predetermined central frequency and thus having a different wavelength bandwidth, the totality of said bandwidths combining to define a continuous wideband spectrum; and,
  b. a band pass filter in optical series relationship with said stacked plurality of liquid crystal cell means positioned so that light passing through said stacked plurality of liquid crystal cell means must also pass through said band pass filter, said band pass filter having a pass band equal to said continuous wide band spectrum formed by said totality of bandwidths of said stacked plurality of liquid crystal cell means.

7. A device as in claim 6 wherein each of said liquid crystal cell means contains both nematic and cholesteric liquid crystal material and wherein said predetermined central wavelength to which said cell is tuned is determined by the ratio by weight of cholesteric liquid crystal material in said cell to the total mixture in said cell.

* * * * *